United States Patent [19]
Vogel

[11] 3,897,346
[45] July 29, 1975

[54] FLAME RETARDANT AGENT FOR SYNTHETIC PLASTICS

[75] Inventor: Calvin Vogel, Easton, Pa.

[73] Assignee: GAF Corporation, New York, N.Y.

[22] Filed: June 16, 1972

[21] Appl. No.: 263,527

[52] U.S. Cl............. 252/8.1; 117/100 B; 161/403; 260/37 R; 260/40 TN; 260/42.14; 260/42.24; 260/42.54
[51] Int. Cl.............................................. C09k 3/28
[58] Field of Search.................. 252/8.1; 117/100 B

[56] References Cited
UNITED STATES PATENTS

| | | | |
|---|---|---|---|
| 2,627,475 | 2/1953 | Craig | 252/8.1 X |
| 3,305,431 | 2/1967 | Peterson | 117/160 R X |
| 3,524,761 | 8/1970 | Humphrey | 252/8.1 X |
| 3,668,155 | 6/1972 | Raley | 252/8.1 X |
| 3,677,942 | 7/1972 | Feiner et al | 252/8.1 |

Primary Examiner—Leland A. Sebastian
Attorney, Agent, or Firm—Walter C. Kehm; James N. Blauvelt

[57] ABSTRACT

A flame retardant composition and process for preparing same, said composition comprising material, capable of being rendered flame retardant, in particulate form selected from the group consisting of the borates-, phosphates-, sulfamates- or oxides of zinc, magnesium, calcium, barium or aluminum, having deposited thereon from solution, a $C_{2-6}$ aliphatic compound such as 2,3-dibromo-1,4-butenediol.

9 Claims, No Drawings

FLAME RETARDANT AGENT FOR SYNTHETIC PLASTICS

BACKGROUND OF THE INVENTION

This invention relates to flame retardant compositions for use in connection with synthetic resins, and, more particularly, to a composition containing a flame retarding amount of a mixture of a polybrominated $C_{2-6}$ aliphatic compound deposited on a metal borate, phosphate, sulfamate or oxide.

Flame retardancy has become a major specification consideration in industry for many plastic articles used in electronic and electrical applications as well as in industrial, commercial and household products. The polyolefins have been, and are being, considered in these areas and specifically in the textile area where filaments of these polymers, having desirable chemical and physical properties offer much in specific end uses; however, the art has not been able to develop a satisfactory fire retardant additive or additives for polyolefins or many other synthetic resins.

The production of plastic resin compositions which are flame retardant, i.e., have high resistance to heat, is of considerable commercial importance. For example, such articles as castings, moldings, formed or laminated structures and the like are required or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall panelings, windows; items such as ashtrays, wastebaskets and the like are further examples of plastic products wherein flame resistance is desirable.

It is also essential, in the production of carpets, that a suitable textile fire retardant be used.

In selecting such an additive, care must be taken with respect to the properties of the resin, such as color, flexibility, tensile strength, electrical properties, softening point, etc. To date, the art has been unable to develop a suitable system which will impart fire retardancy to synthetic resins without unsatisfactorily effecting some of the desirable properties thereof.

There are various materials which may be incorporated into thermoplastic resins in order to improve the flame resistance thereof. Many compounds are commercially available for such a use, among them being halogenated diols, brominated aromatic compounds, chlorinated paraffin wax, and chlorinated paraffins used together with antimony compounds. A drawback of these latter compounds, however, has been the fact that generally large amounts thereof are needed and that the antimony compounds are costly and in rather short supply.

Moreover, these prior art additives tend to crystallize or exude from the resin as an oil after having been incorporated therein for a relatively short period of time.

The use of aromatic substances containing bromine or chlorine as flame retardants for thermoplastic polymers is known Belgium Pat. No. 54.908). In order to achieve adequate self extinguishing properties, however, it is necessary, in accordance with the disclosure of this patent, to add relatively large amounts of halogen containing substances to the polymers. Certain other properties are, however, detrimentally affected by the addition of such large amounts.

Enhancing the flame retardant effect of halogen containing compounds by synergist additives is also known whereby, adequate self-extinguishing characteristics can thus be obtained with substantially smaller amounts of halogen-containing compounds with an accompanying decrease in harmful physical properties. For example, it is possible to improve the flame retardant effect of organic bromine compounds by adding an organic peroxide thereto. Organic peroxides have the disadvantage that they are toxic and sometimes readily decompose explosively; moreover when used in polystyrene, they cause it to become brittle. Evidence of such toxicity is indicated by the fact that some personnel who handle such a peroxide contract dermatosis. Moreover, expensive and troublesome precautions must be taken in the handling of these peroxides in order to prevent explosions.

The use of chlorinated hydrocarbons with antimony oxides as fire retardants or flame proofing agents for thermoplastic polymers as stated above is also known.

There has now been found a group of compositions which can be added to synthetic resins in relatively samll amounts to impart satisfactory flame retardance to such resins without crystallizing or exuding therefrom after incorporation therein.

SUMMARY OF THE INVENTION

It is an object of the instant invention to provide a novel flame retardant for use in synthetic resinous compositions.

It is a further object of the instant invention to provide a novel composition which imparts flame retardance to polymeric materials of the type listed hereinbelow.

It is still another object of the present invention to provide self-extinguishing plastic compositions which contain lesser amounts of flame retardant compounds than prior art materials.

It is another object of the instant invention to avoid one or more drawbacks of the prior art.

These and other objects will become more apparent to those skilled in the art from the following description.

The flammability of various systems may be measured in a variety of ways, one of which is the Oxygen Index Test (ASTM D 2863-70). The Oxygen Index is the minimum amount of oxygen in a variable oxygen and nitrogen atomsphere that will permit the sample to burn completely. This may be expressed numerically as the amount of Oxygen, O.I., which is the amount of oxygen divided by (amount of oxygen+amount of nitrogen) $\times$ 100.

For example, a specimen burning in atmospheric oxygen would have an Oxygen Index of 21. The higher the Oxygen Index of a given sample the more resistant to burning such a sample would be. In other words, where the Oxygen Index is 40, that means that an atmosphere of over 40% Oxygen would be needed in order to have burning occur. Inasmuch as the amount of oxygen in the atmosphere on earth is measured at 21, flame retardants that are able to raise the Oygen Index above 21 are suitable, the higher the Oxygen Index the greater being the efficiency of the flame retardant.

Broadly speaking, the instant invention provides a composition comprising material in particulate form selected from the group consisting of the borates-, phosphates-, sulfamates- and oxides of zinc, magnesium, calcium, barium and aluminum having deposited from solution thereon a polybrominated $C_{2-6}$ aliphatic compound; a process for preparing such a composition, a use therefor and an article treated therewith.

Thermoplastic as well as thermoset resins may be treated. Exemplary resins are, for example, styrene-butadiene latices; polystyrene; polyolefins such as polyethylene, polypropylene, and polybutylene; polyurethane; acrylonitrile-styrene-butadiene rubber; acrylates and the like; in chips, films, sheets and bulk castings.

DETAILED DESCRIPTION

In accordance with the teachings of the instant invention, a flame retardant composition is prepared by applying a mixture composed of said polybrominated $C_{2-6}$ aliphatic compound and one of said metal borates, phosphates, sulfamates or oxides to a flammable substrate to be rendered fire retardant. The polybrominated $C_{2-6}$ aliphatic compound or mixture thereof can contain as few as two bromine atoms. Exemplary of such compound are brominated aliphatic members such as polybromoethane, propane, etc., and the brominated alkenes corresponding thereto. Brominated alcohols may also be employed such as 2,3-dibromo-propanol; 2,3-dibromo-butanediol, etc, and the brominated alkenols corresponding thereto. It is preferred that the said compound be a polybrominated alcohol, such as, dibromobutenediol.

The amount of the additive may range from five parts polybrominated compound and one part metal borate, phosphate, sulfamate or oxide to one part polybrominated compound to one part metal borate, phosphate, sulfamate or oxide. The flame retardant additive composition is used in a ratio of 1–30%, preferably 8–20% additive to each 100 parts resin. When applied to a carboxylated SBR latex, the additive is applied in the ratio of 1:1 to 3:1, respectively.

For example, an excellent active fire retardant additive is dibromo-butenediol deposited on zinc borate. It has been found during the work performed developing the instant invention that to be an effective fire retardant an additive must (a) be resistant to water and weathering, (b) contain no water and be sufficiently low in vapor pressure so that it can be extruded without gassing, (c) have good thermal stability at the extrusion temperature for the thermoplastic used, (d) be capable of being made compatible with the thermoplastic at extrusion and end use temperatures so as not to separate or exude from the polymer, (e) contain an adequate percentage of halogen so that a small amount of the additive will be effective, since the addition of any significant amount of additive would undoubtedly destroy or impair desirable polymeric properties, and (f) be non-reactive with the base polymer at extrusion temperatures yet be sufficiently reactive or unstable at ignition temperatures to extinguish a flame or impede combustion.

Various techniques can be employed in producing the novel flame retardant compositions of the instant invention, however, it is preferred that the metal borate, phosphate, sulfamate or oxide be added to a heated solution containing one of said polybrominated compounds. The solution can be made by adding said compound to an adequate amount of solvent, i.e., water or xylene. The solvent containing compound can be heated up to the boiling point of said solvent. Once the addition has taken place the solution should thereafter be allowed to cool to room temperature while being stirred. A solid mass is obtained which, upon filtration and being dried, becomes a powdery solid fire retardant with some indication of complexing.

Various techniques can also be employed for mixing the fire retardant with the resin in order to impart flame retardance thereto. It is preferred, however, that the mixing be a dry mix rather than one from solution inasmuch as depending upon the particular substrate to which the fire retardant is to be applied, various problems are encountered with respect to adhesion of the fire retardant thereto.

The bending of the above composition with the resin may be accomplished at elevated temperature or at room temperature on a blending mill.

The additive when added to the resin should be mixed thoroughly to distribute the additive substantially uniformly throughout the resin. It is important in mixing that the constituents be dispersed to provide a resultant resinous blend which will insure extrusion of a uniform polymer such that areas within the polymer will not differ from adjacent or other polymer areas in chemical or physical properties.

If hot blending is practiced it is desirous that the ingredients be thoroughly mixed to insure even distribution of the additive and to insure uniform fire retardant properties. Such practices also insure a good free flowing feed to the extrudent to achieve a uniform extrusion without feed interuption as the result of clogging the hopper. Blending may also be accomplished in a solvent in accordance with techniques well known in the art.

As an alternative, surface coating of a shaped article may be accomplished; however, proper selection must be made of a dispersant, or of a combination of dispersants, which will aid the entry of at least the minimum quantity of fire retardant ingredients within the polymer or at least within the immediate surface area of the polymer. Of course, this problem is avoided if the fire retardant additive is simply coated on the surface or the article, or if it only penetrates the surface in an amount sufficient to permit it to adhere to the polymeric article and thus provide a relatively permanent protective coating.

The following examples are given by way of illustration only, all parts and proportions therein and in the appended claims being by weight unless specified otherwise.

EXAMPLE I

At 80°C., 250 g. "Firebrake ZB" (U.S. Borax brand of zinc borate: $2ZnO \cdot 3B_2O_3 \cdot 3.5H_2O$) is added to a solvent of 250 g. dibromobutenediol in 250 ml. water. The solution is allowed to cool to room temperatuare while being stirred continually. A solid mass is obtained which is filtered and dried at 40°C under vacuum to give 469 g. of a white, powdery solid. The sample contains 39.6% bromine.

EXAMPLE II

The procedure of Example I is followed except that 200 g. zinc borate is used. There is obtained 418 g. of product.

EXAMPLE III

The procedure of Example I is followed except that 150 g. of zinc borate is used. There is obtained 380 g. of product.

EXAMPLE IV

The procedure of Example I is followed except that 100 g. of zinc borate is used. There is obtained 273 g. of product.

EXAMPLE V

A mixture of 100 g. dibromobutenediol and 1,000 ml. xylene are heated to reflux whereupon a homogeneous solution results. To this solution is added 100 g. of zinc borate, and the mixture is allowed to cool to room temperature while being stirred continually. The solid results is removed by filtration and dried at 50°C. under vacuum. There is then obtained 191 g. % of a powdery solid that contains 32.97% bromine.

EXAMPLE VI

Various formulations, consisting of 20 parts carboxylated SBR (styrene-butadiene rubber) latex, 40 parts whiting (calcium carbonate) and 20 parts fire retardant composition of the above examples are prepared and coated with a roller on jute to give a coating that is 24 oz./yd.$^2$. After curing at 300°F for 15 minutes, 2½ in. × 6 in. strips are cut and the flammability measured. The flammability measurement is based on the determination of the oxygen index.

The apparatus used is the "General Electric Oxygen Index Flammability Gauge," (described in their bulletin No. 4541K25-001B). The sample is mounted vertically on a 2 inch wide U-shaped clamp with the 6 inch side in a vertical direction. The combustion chamber is a heavy-walled pyrex glass tube of 71.3 cm$^2$ cross sectional area. Oxygen and nitrogen are introduced at the bottom of the combustion chamber. The different composition of the gases is achieved by varying the oxygen and nitrogen flow rates. The samples are ignited by a propane torch. Comparative results of the different flammability measurements are given in Table I.

TABLE I

| Flame Retardant | Oxygen Index = OI |
|---|---|
| None | 22.3 |
| Example I | 32.4 |
| Example IV | 28.0 |
| Zinc Borate | 23.2 |
| Dibromobutenediol | 26.6 |
| Antimony oxide | 25.2 |
| Example XI | 30.7 |

EXAMPLE VII

The procedure of Example VI is followed except that the formulation contains 20 parts SBR latex and 60 parts flame retardant. The results are given in Table II.

TABLE II

| Flame Retardant | Oxygen Index |
|---|---|
| Example I | 40.8 |
| Zinc Borate | 29.5 |

EXAMPLE VIII

Using standard milling techniques low density* polyethylene is mixed on a two-roll mill with 10% of the product from Example I, pressed into 125 mil. sheets and then cut into 2 × 6 in. strips and the procedure of Example VI is followed.

(*Melt Index 2)

TABLE III

| Flame Retardant | Oxygen Index |
|---|---|
| None | 17.9 |
| Zinc Borate | 17.9 |
| Example I | 19.0 |

EXAMPLE IX

Using standard milling techniques polystyrene is mixed on a two roll mill with 50% of various flame retardants, pressed into 125 mil. sheets and then cut into 2½ × 6 in. strips and the procedure of Example VI followed. The results are given in Table IV.

TABLE IV

| Flame Retardant | Oxygen Index |
|---|---|
| None | 18.1 |
| Example I | 34.3 |
| Dibromobutenediol | 26.1 |
| Zinc Borate | 22.3 |

EXAMPLE X

Polyurethane* is milled on a Brabender Plastograph with the product from Example IV, pressed into 125 mil. sheets and cut into 2 × 4 in. strips and the procedures of Example VI followed. The results are given in Table V.

(*Estane 58101)

TABLE V

| Flame Retardant % by wt. | OI* | Tensile (psi.) 100% Elongation | 200% Elongation | 300% Elongation | Ultimate | %Elongation at Break |
|---|---|---|---|---|---|---|
| 0 | 22.1 | 1687 | 2213 | 3003 | 6257 | 592 |
| 5 | 23.7 | 1643 | 2020 | 2492 | 3735 | 521 |
| 10 | 26.1 | 1515 | 1717 | 2017 | 2132 | 370 |
| 15 | 31.2 | 1400 | 1590 | 1853 | 1867 | 325 |
| 20 | 30.5 | 1235 | | | 1272 | 130 |
| 30 | 32.4 | | | | | |

*Oxygen Index No.

EXAMPLE XI

At 80°C. 250 g. of antimony oxide is added to a solution of 250 g. dibromobutenediol in 250 ml. water. This mixture is then cooled to room temperature while being stirred continually. The mixture is filtered and the solid dried at 40°C. under vacuum to give 487 g. of product. This product contains 28% bromine.

EXAMPLE XII

Polyurethane (injection molding grade 80% poly butyleneadipate (MW=1100); 20% poly teramethyleneether glycol) is milled on a Barbender Plastograph with the various antimony containing products described below, pressed into 125 mil. sheets and cut into 2 × 6 in. strips and the procedure of Example VI followed. The results are given in Table VI.

TABLE VI

| Additive | Amount | Oxygen Index |
|---|---|---|
| Antimony Oxide | 10% | 24.5 |
| Antimony Oxide | 20% | 24.8 |
| Example XI | 10% | 28.2 |
| Example XI | 20% | 28.2 |

EXAMPLE XIII

A 30 g. sample of polystyrene (melt index 7.5) is milled on a Brabender Plastograph with the product from Example I, pressed into 125 mil. sheets and the oxygen index measured on a 2 × 6 in. strip. A value of 29.7 is obtained. As a comparison, equal amounts of dibromobutenediol and zinc borate are mixed mechanically. It was not possible to mill 30 g. of this mixture into 30 g. of polystyrene on the Brabender.

Since it is obvious that numerous changes and modifications can be made in the above-described details without departing from the spirit and nature of the invention, it is to be understood that all such changes and modifications are included within the scope of the invention.

I claim:

1. A fire retardant additive comprising a polybrominated $C_2$-$C_6$ aliphatic compound and an inorganic material selected from the group consisting of the borates-, phosphates-, sulphamates-, and oxides- of zinc, magnesium, calcium, barium, and aluminum.

2. A fire retardant additive according to claim 1, wherein said compound is a dibrominated diol.

3. A fire retardant additive according to claim 1, wherein said compound is selected from the group consisting of polybrominated alkanediols and polybrominated alkene diols.

4. A fire retardant additive according to claim 3 wherein said compound is selected from the group consisting of 2,3-dibromo-1,4-butanediol and 2,3-dibromo-1,4-butenediol.

5. A fire retardant additive according to claim 1 wherein said inorganic material is zinc borate.

6. A fire retardant additive according to claim 1 wherein the ratio of said inorganic material to said compound is from about 1:5 to 1:1.

7. A process for preparing a fire retardant additive according to claim 1, comprising adding said inorganic material to a solution containing said compound.

8. A process according to claim 7 wherein the solvent of said solution is selected from the group consisting of water and xylene.

9. A process according to claim 8 wherein said compound is a dibrominated diol.

* * * * *